United States Patent Office 3,515,764
Patented June 2, 1970

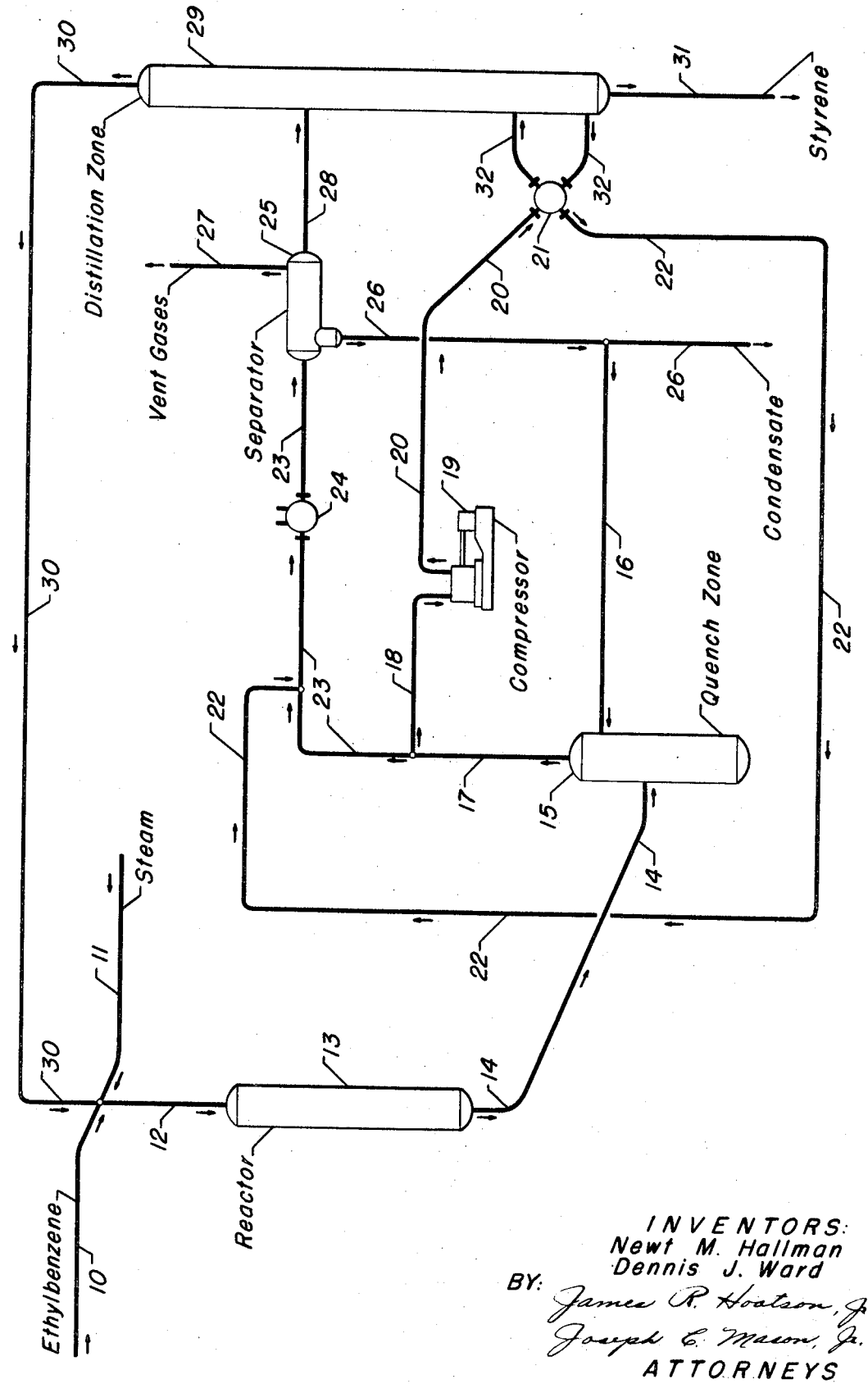

3,515,764
CATALYTIC CONVERSION PROCESS
Newt M. Hallman, Mount Prospect, and Dennis J. Ward, Lombard, Ill., assignors to Universal Oil Products Company, Des Plaines, Ill., a corporation of Delaware
Filed May 21, 1968, Ser. No. 730,773
Int. Cl. C07c 5/18, 15/10
U.S. Cl. 260—669                        5 Claims

ABSTRACT OF THE DISCLOSURE

Process for converting hydrocarbons, such as ethylbenzene to styrene, wherein the entire reaction zone effluent is compressed and used to provide reboiler heat to fractionators utilized in recovering styrene from the effluent of the reaction zone.

BACKGROUND OF THE INVENTION

This invention relates to the endothermic catalytic conversion of hydrocarbons. It particularly relates to an improved process for the dehydrogenation of ethylbenzene to styrene. More specifically, this invention relates to a more economic and facile catalytic method for obtaining styrene through the steam dehydrogenation of ethylbenzene.

Those skilled in the art recognize the importance of being able to economically produce styrene since this chemical, otherwise called "phenyl ethylene" is extensively employed throughout commerce as a raw material for the production of resins, plastics, and elastomers. Specifically, styrene is copolymerized with butadiene to produce high molecular weight synthetic rubber. Although styrene may be recovered in limited quantities from various coal tars and heavy crude oils, it is preferred to synthesize large quantities by the dehydrogenation of ethylbenzene. The raw material, ethylbenzene, can either be separated from petroleum fractions by super-distillation or can be synthetically prepared, such as through the alkylation of benzene with ethylene.

The prior art methods for producing styrene are generally carried out by passing a mixture of ethylbenzene and steam over a fixed bed of dehydrogenation catalyst. In order to heat the reactants to the reaction temperature, it is also general practice to admix the ethylbenzene which is at a temperature significantly below reaction temperature with steam which has been superheated to a temperature above the reaction temperature so that the admixture is at reaction temperature as it passes over the dehydrogenation catalyst. Since the basic chemical reaction involved, namely the dehydrogenation of ethylbenzene to styrene, is endothermic there is a significant decrease in the reaction zone temperature as the reaction proceeds. It is not unusual in these prior art processes to witness a drop of perhaps 50° F. to 150° F. within the reaction zone or across a particular catalyst bed. Naturally, as the temperature decreases, the rapidity and efficiency of the reaction also decreases so that the overall efficiency of the process declines to a point where it would be economically unattractive unless processing schemes were found to overcome this disadvantage.

Again, the prior art has attempted to solve this problem by drastically increasing the temperature of the superheated steam so that the difference between the inlet temperature of the reactants and the outlet temperature of the reaction products averaged, generally, the required reaction temperature. However, it was noted that at the instant the superheated steam is admixed with ethylbenzene, the ethylbenzene undergoes thermal decomposition or cracking through the pyrolytic reaction. In many instances, such pyrolysis is effected to such a degree that the process becomes uneconomical due to the loss of ethylbenzene to carbon monoxide, carbon dioxide, polymeric materials, tars, etc. Another disadvantage involved in this dehydrogenation process is the utility cost in raising the temperature of large quantities of steam to a level far above that required for effecting the dehydrogenation of ethylbenzene and then subsequently wasting this large amount of low grade heat by condensing the steam to water and removing the condensate from the process area. Thus, the failure of the prior art to carefully utilize all of the heat available in the low grade steam remaining in the effluent from the conversion zone has made it extremely difficult, even with modern innovations, to produce styrene in an economical manner.

SUMMARY OF THE INVENTION

Accordingly, it is an object of this invention to effect a more economic method for dehydrogenating ethylbenzene to produce styrene in high concentration.

It is also an object of this invention to provide a process for the endothermic catalytic conversion of hydrocarbons in the presence of steam whereby the low grade heat available in the effluent steam is productively utilized.

It is another object of this invention to provide a process for the dehydrogenation of ethylbenzene to styrene characterized by a high conversion per pass of ethylbenzene to styrene.

In accordance with the practice of the present invention there is provided a process for the endothermic catalytic conversion of hydrocarbons in a conversion zone which comprises passing hydrocarbons to be converted into said zone under conversion conditions; removing from said zone a total effluent stream comprising converted hydrocarbons, unconverted hydrocarbons, and gases; quenching said total effluent with an aqueous stream; passing converted hydrocarbons and unconverted hydrocarbons into a fractionation zone under conditions including the use of reboiler heat sufficient to separate the converted hydrocarbons from the unconverted hydrocarbons; passing at least a portion of said quenched total effluent stream into compressing means; and, passing said compressed effluent into said fractionation zone as at least part of the reboiler heat therein.

A particular embodiment of this invention is the process hereinabove wherein the conversion reaction comprises the dehydrogenation of ethylbenzene to styrene.

Therefore, it can be seen from the embodiments presented hereinabove that the essence of the present invention resides in the compression of the total effluent in a unique manner in order to provide a compressed stream having a high enough heat content for utilization as reboiler heat in the fractionators associated with the recovery of individual components from the effluent stream which is being compressed. Thus, the present invention encompasses a catalytic process, preferably, for effecting the steam dehydrogenation of ethylbenzene to styrene.

The advantages of the present inventive process will be more clearly understood with reference to the attached drawing which is a schematic representation of the process flow illustrating a preferred embodiment of the present invention. Although the present invention encompasses a catalytically-conducted process, it is understood that the same is not to be unduly limited to the utilization of a particular catalytic composite, containing a particular concentration of components. The catalyst employed for the dehydrogenation reaction is preferably an alkali-promoted iron catalyst of the type commonly known as "Shell 105" or "Shell 205." Such a catalyst may consist essentially of 85.0% by weight of ferrous oxide, 2.0% by weight of chromia, 12.0% by weight of potassium hydroxide, and 1.0% by weight of sodium hydroxide, or 90.0% by weight of iron oxide, 4.0% by weight of chromia and 6.0% by weight of potassium carbonate. While these known commercial dehydrogenation catalysts are preferred, other known dehydrogenation catalysts may be employed, and include ferrous oxide-potassium oxide, other metal oxides and/or sulfides, including those of calcium, lithium, strontium, magnesium, beryllium, zirconium, tungsten, molybdenum, titanium, hafnium, vanadium, aluminum, chromium, copper, and mixtures of two or more including chromia-alumina, alumina-titania, alumina-vanadia, etc. Similarly, the various methods of preparing the aforesaid dehydrogenation catalysts are well known within the prior art, and it is understood that the present process is not dependent upon the utilization of a catalytic composite manufactured in any particular manner.

DETAILED DESCRIPTION OF THE DRAWING

With reference now to the attached drawing, ethylbenzene enters the process through line 10 being also admixed with recycle ethylbenzene from line 30. Typically, the ethylbenzene stream is at a temperature of about 100° F. In order to facilitate the vaporization of the ethylbenzene and to provide sufficient heat for the reaction, steam is added to the ethylzenzene feed stream from line 11 and the admixture of ethylbenzene and steam is passed into catalytic reaction zone 13 via line 12.

Reaction zone 13 comprises, for example, three (3) fixed beds of catalyst (not shown) for effecting the dehydrogenation reaction. The catalyst employed is preferably an alkali-promoted iron catalyst of the type described hereinabove.

The admixture of steam and ethylbenzene passes from line 12 into the catalyst beds disposed within reactor 13. The reactants enter the catalyst at a temperature from 1000° F. to 1400° F., typically, at a temperature of about 1125° F. sufficient to convert ethylbenzene to styrene. The conditions within the catalyst bed include not only the catalyst and temperatures as above described, but also include the weight hourly space velocity. The space velocity as used herein is defined as pounds of ethylbenzene charged per hour per pound of catalyst disposed in reactor 13. Typically, the weight hourly space velocity is within the range of about 0.1 to about 2.0 and, preferably, within the range of about 0.2 to about 1.5. The space velocity at any given time is correlated with a selected inlet temperature to result in a reactor product effluent having a temperature within the range of about 1000° F. to about 1400° F., typically, 1065° F.

The amount of catalyst contained in each catalyst bed may be varied considerably. Typically, the bed depth may range from two (2) feet to six (6) feet, the lower range being preferred to minimize pressure drop. While the invention will be described as utilizing a reactor having three (3) catalyst beds disposed therein, it is within the concept of the present invention to utilize as few as one (1) catalyst bed or in some instances as many as five (5) or more catalyst beds.

It is also within the scope of this invention to use a combination of means to provide the reheating necessary between catalyst beds in order to overcome the endothermic nature of the reaction. For example, it will be preferred to utilize superheated steam as a means of supplying the reheating necessary. Other means, however, such as flue gas, electrical heating, and the like, may be used with satisfactory results.

The reactor pressure may also be varied over a considerable range as long as sufficient diluting steam or heating gas is present to hold the partial pressure of the hydrocarbons at a low level, e.g. below atmospheric pressure. Sufficient pressure must be maintained at the reactor inlet to overcome the pressure drop through the multiple beds of catalyst contained in the reactor vessels or in separate vessels if each such bed is contained in a separate reactor. Either multiple beds contained in a single reactor or single beds in multiple reactors or mixtures of these arrangements may be used in the satisfactory practice of this invention.

As the reactants in line 12 contact the catalyst contained in, for example, the first catalyst bed of reactor 13, there is a temperature decrease observed across the catalyst bed due to the endothermic nature of the reaction. Without additional heat being added, the temperature of the effluent leaving the first catalyst bed would be in the order of from 50° F. to 150° F. or more, less than the inlet temperature selected for the material in line 12. Therefore, superheated steam as reheating is introduced into the effluent leaving the first catalyst bed by means not shown. Each catalyst bed is handled in a similar manner, and in the preferred embodiment of this invention a total amount of steam, say, from about 1 pound per pound to about 20 pounds of steam per pound of ethylbenzene will be utilized in converting ethylbenzene to styrene. Typically, the amount of steam and ethylbenzene are in proportion of about 2.8 pounds of steam per pound of ethylbenzene, As the total effluent leaves reactor 13 via line 14 there is an overall conversion of ethylbenzene to styrene of at least 50% and, typically, may be 65%. This total effluent in line 14 contains styrene, unconverted ethylbenzene, gaseous products including hydrocarbons and hydrogen which have been produced during the dehydrogenation reaction, and heating gas and/or steam. This total effluent is cooled rapidly by, say, heat exchanger means, not shown, to prevent the styrene from undergoing polymerization which would then cause plugging of the various process lines. In accordance with the practice of this invention, the total product effluent is quenched rapidly by final passage into quench zone 15 wherein its temperature is immediately decreased to at least 230° F. by the introduction of steam condensate via line 16. The entire cooled effluent is now removed from quench zone 15 via line 17.

According to a required feature of the present invention, at least a portion of the quenched effluent in line 17 is passed via line 18 into compressor means 19 wherein its pressure is raised to substantially superatmospheric pressure thereby providing a sufficiently high temperature of the compressed material in line 20 for supplying reboil heat to subsequent fractionators. The practice of the present invention requires that the compressed portion of the total effluent be passed via line 20 into reboiler 21 to provide reboil heat to fractionator 29 in a manner more fully described hereinafter.

The compressed portion of the total effluent which has given up a substantial amount of its heat in reboiler 21 is passed via lines 22 and 23 through cooler 24 into separator 25. If the entire total effluent in line 17 is not compressed in compressor 19, then the remaining portion of the cooled effluent is passed from line 17 via line 23 through cooler 24 also into separator 25.

In separator 25, the total effluent is now separated into a liquid hydrocarbon stream containing, for example, styrene, ethylbenzene, and by-product liquids, such as benzene and toluene, and a steam condensate fraction. The steam condensate is removed from fractionator 25 via line 26 and as necessary, a portion thereof is passed via line 16 as quench to quench zone 15 in the manner previously described. Excess steam condensate, if any, is removed from the process via line 26. The hydrocarbon gases plus hydrogen are removed from separator 25 via line 27 for recovery and/or use as fuel.

The liquid hydrocarbons are passed into distillation zone 29 which may comprise a plurality of distillation columns for the separation of the liquid hydrocarbons into separate components. For example, distillation zone 29 may include distillation facilities for the recovery of benzene and toluene as separate product streams, for the recovery of ethylbenzene as a separate product stream, and the recovery of styrene in high concentration and high purity. For simplicity sake, distillation zone 29 has been shown as producing ethylbenzene via line 30 which is recycled, preferably, to reactor 13 as previously described, In addition, styrene in high purity and high concentration is shown as being withdrawn via line 31.

In accordance with a required feature of this invention, a bottoms material from at least one of the distillation columns described hereinabove is passed via line 32 through reboiler 21 in indirect heat exchange with the compressed total effluent in line 20 in a manner sufficient to provide reboiler heat to such distillation column.

It is within the concept of the present invention that the compressed effluent reboiler system be utilized on one or all of the distillation columns embodied in distillation zone 29. There must, of course, be at least one column being reboiled by the compressed effluent in the manner described. Whether other distillation columns can also be reboiled will be left to the judgment of those skilled in the art utilizing the teachings presented herein.

Although the present invention has been described with reference to the appended drawing and to the reaction for the dehydrogenation of ethylbenzene to styrene, it is to be noted that the process of the present invention is equally applicable broadly to the endothermic catalytic conversion of aromatic hydrocarbons. It is particularly applicable, however, to the dehydrogenation of alkylated aromatic hydrocarbons, such as ethylbenzene, isopropylbenzene, diethylbenzene, ethylnaphthalene, ethylchlorobenzene, and the like.

PREFERRED EMBODIMENT

Therefore, in accordance with the teachings presented hereinabove with particular reference to the appended drawing, the present invention in its preferred embodiment provides a process for producing styrene in high concentration via the catalytic dehydrogenation of ethylbenzene in a reaction zone which comprises the steps of: (a) introducing ethylbenzene and steam into said reaction zone under conditions sufficient to convert ethylbenzene to styrene; (b) removing from the reaction zone a total effluent comprising styrene, ethylbenzene, and steam; (c) quenching said effluent by direct contact with an aqueous stream; (d) compressing at least a portion of said quenched effluent and passing the compressed effluent into reboiler means associated with hereinafter specified fractionation means; (e) withdrawing the effluent of step (d) from the reboiler means and passing the withdrawn stream into separation means under conditions sufficient to obtain a hydrocarbon fraction containing styrene and ethylbenzene and an aqueous stream; (f) introducing said hydrocarbon fraction into fractionation means under conditions including the use of reboiler heat sufficient to produce a product stream comprising styrene and a hydrocarbon stream comprising ethylbenzene; and, (g) recovering styrene in high concentration.

The invention claimed:

1. Process for the endothermic catalytic conversion of hydrocarbons in a conversion zone which comprises passing hydrocarbons to be converted into said zone under conversion conditions; removing from said zone a total effluent stream comprising converted hydrocarbons, unconverted hydrocarbons, and gases; quenching said total effluent with an aqueous stream; passing converted hydrocarbons and unconverted hydrocarbons into a fractionation zone under conditions including the use of reboiler heat sufficient to separate the converted hydrocarbons from the unconverted hydrocarbons; passing at least a portion of said quenched total effluent stream into compressing means; and, passing said compressed effluent into said fractionation zone as at least part of the reboiler heat therein.

2. Process according to claim 1 wherein said conversion is the hydrogenation of alkylaromatic hydrocarbons.

3. Process according to claim 2 wherein said aromatic hydrocarbon comprises ethylbenzene.

4. Process for producing styrene in high concentration via the catalytic dehydrogenation of ethylbenzene in a reaction zone which comprises the steps of:
(a) introducing ethylbenzene and steam into said reaction zone under conditions sufficient to convert ethylbenzene to styrene;
(b) removing from the reaction zone a total effluent comprising styrene, ethylbenzene, and steam;
(c) quenching said effluent by direct contact with an aqueous stream;
(d) compressing at least a portion of said quenched effluent and passing the compressed effluent into reboiler means associated with hereinafter specified fractionation means;
(e) withdrawing the effluent of step (d) from the reboiler means and passing the withdrawn stream into separation means under conditions sufficient to obtain a hydrocarbon fraction containing styrene and ethylenbenzene and an aqueous stream;
(f) introducing said hydrocarbon fraction into fractionation means under conditions including the use of reboiler heat sufficient to produce a product stream comprising styrene and a hydrocarbon stream comprising ethylbenzene; and,
(g) recovering styrene in high concentration.

5. Process according to claim 4 wherein the aqueous stream of step (e) is returned to step (c) as quench.

References Cited
UNITED STATES PATENTS

| | | | |
|---|---|---|---|
| 3,384,577 | 5/1968 | Shaffer et al. | 208—363 |
| 3,409,689 | 11/1968 | Ward | 260—669 |
| 3,417,156 | 12/1968 | Berger | 260—669 |

DELBERT E. GANTZ, Primary Examiner

C. R. DAVIS, Assistant Examiner

UNITED STATES PATENT OFFICE
CERTIFICATE OF CORRECTION

Patent No. 3,515,764            June 2, 1970

Newt M. Hallman et al.

It is certified that error appears in the above identified patent and that said Letters Patent are hereby corrected as shown below:

Column 5, line 2, "described," should read -- described. --. Column 6, line 15, "hydrogenation" should read -- dehydrogenation --; line 36, "ethylenbenzene" should read -- ethylbenzene --.

Signed and sealed this 23rd day of February 1971.

(SEAL)
Attest:

Edward M. Fletcher, Jr.          WILLIAM E. SCHUYLER, JR.

Attesting Officer                Commissioner of Patents